(12) United States Patent
Miyanishi et al.

(10) Patent No.: US 6,956,808 B2
(45) Date of Patent: Oct. 18, 2005

(54) OPTICAL DEVICE AND OPTICAL SENSOR

(75) Inventors: Shintaro Miyanishi, Ikoma-gun (JP); Kunio Kojima, Nabari (JP); Hiroshi Fuji, Souraku-gun (JP); Mototaka Taneya, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 176 days.

(21) Appl. No.: 10/680,215

(22) Filed: Oct. 8, 2003

(65) Prior Publication Data

US 2004/0257965 A1 Dec. 23, 2004

(30) Foreign Application Priority Data

Oct. 16, 2002 (JP) ........................ 2002-302188

(51) Int. Cl.$^7$ .............. G11B 7/00; H01S 5/00
(52) U.S. Cl. ............ 369/121; 369/122; 372/43; 372/45; 372/75
(58) Field of Search .................. 369/116, 121, 369/122, 112.01, 44.11, 44.27; 372/43, 44, 45, 49, 54, 75

(56) References Cited

U.S. PATENT DOCUMENTS

| | | | | |
|---|---|---|---|---|
| 5,715,266 A | * | 2/1998 | Takagi | 372/45 |
| 6,618,410 B1 | * | 9/2003 | Fischer et al. | 372/45 |
| 6,826,219 B2 | * | 11/2004 | Weingarten et al. | 372/49 |

FOREIGN PATENT DOCUMENTS

JP          2000022277          1/2001

* cited by examiner

*Primary Examiner*—Muhammad Edun
(74) *Attorney, Agent, or Firm*—Nixon & Vanderhye, P.C.

(57) ABSTRACT

An aperture 12 for producing an evanescent wave is provided at an n-Au electrode 106. The aperture 12 is directed roughly perpendicularly to a direction in which end faces 104a of an active layer 104 of an optical device oppose to each other, and therefore, laser light generated in the active layer 104 is made incident in the form of the p-polarized light. By the incidence of the p-polarized laser light, an evanescent wave of a comparatively great intensity is obtained from the aperture 12. With this arrangement, an optical device capable of obtaining an evanescent wave of a comparatively great intensity is provided.

8 Claims, 11 Drawing Sheets

OPTICAL DEVICE AND OPTICAL SENSOR

BACKGROUND OF THE INVENTION

The present invention relates to an optical device and an optical sensor.

In recent years, for further densification of optical disk information recording media, an optical device, which outputs a near-field light (including an evanescent wave), has attracted attention as an optical device capable of obtaining light of an extremely minute spot size. Moreover, with regard to the utilization of near-field light, there are expected applications to a wide variety of technological fields. As a prior art, there is the optical device described in Japanese Patent Laid-Open Publication No. 2000-22277. This prior art obtains light of an extremely minute spot size by providing a wave front transforming portion that has a pinhole of an aperture diameter smaller than the wavelength of light at the laser light emitting end face of a semiconductor laser device, transforming the laser light into an evanescent wave via this pinhole and generating a near-field in the vicinity of the pinhole.

The intensity of the evanescent wave has a dependency on the polarization direction of light incident on an interface. There can be obtained an evanescent wave of a size about four or more orders of magnitude greater in terms of an intensity ratio when light of the polarized light that has an electric field vector component perpendicular to the interface where the evanescent wave is generated (hereinafter referred to as the p-polarized light) is made incident than when light of the polarized light that has an electric field vector component parallel to the interface (hereinafter referred to as the s-polarized light) is made incident. However, according to the aforementioned conventional optical device, the electric field vector of the laser light becomes roughly parallel mainly to a reflection end face that serves as the interface in the semiconductor laser device that is performing laser oscillation. That is, the laser light of the s-polarized light is mainly made incident on the reflection end face. Accordingly, there is a problem that the transformation efficiency of the laser light into the evanescent wave is poor. There is a further problem that no resonance effect of the near-field light by a surface plasmon can be obtained by the aforementioned prior art since the surface plasmon excitation in a metal film, a metal particle or the like can be generated only by the p-polarized light.

SUMMARY OF THE INVENTION

Accordingly, the object of the present invention is to provide an optical device capable of obtaining an evanescent wave of a comparatively great intensity.

In order to achieve the above object, the present invention provides an optical device comprising:
a light-emitting layer having two end faces that form a laser resonator;
an electromagnetic wave producing portion that is located between the two end faces in a direction in which the two end faces oppose to each other and produces an electromagnetic wave from the light-emitting layer.

According to the above-mentioned construction, the electromagnetic wave producing portion is located between the two end faces in the direction in which the two end faces of the laser resonator oppose to each other. Therefore, the laser light generated between the two end faces is made incident on the electromagnetic wave producing portion in a state in which the laser light is the form of the p-polarized light whose electric field vector component is roughly perpendicular to the portion. Consequently, there is produced the evanescent wave as the electromagnetic wave of an intensity greater than that of the conventional s-polarized light by the electromagnetic wave producing portion.

In this case, it is acceptable to form the electromagnetic wave producing portion at the interface where the laser light is totally reflected to generate the evanescent wave or in the layer which is put in contact with the interface and in which the evanescent wave is transmitted.

In one embodiment, the electromagnetic wave producing portion has a refractive index different from a refractive index of a neighborhood of the electromagnetic wave producing portion and, assuming that a wavelength of laser light generated by the laser resonator is 1 and a refractive index of the light-emitting layer is n, then the electromagnetic wave producing portion has a dimension smaller than 1/n.

According to the above-mentioned embodiment, the electromagnetic wave producing portion has the refractive index different from the refractive index of the neighborhood of this electromagnetic wave producing portion and has the dimension smaller than $\lambda/n$. Therefore, the evanescent wave as the electromagnetic wave can be effectively produced from the laser light generated in the light-emitting layer. In this case, the electromagnetic wave producing portion comes to let the laser light pass when the dimension is not smaller than $\lambda/n$, and it becomes difficult to produce the evanescent wave.

In one embodiment, the light-emitting layer has a stripe-shaped light-emitting region,
the electromagnetic wave producing portion is located on a side of the light-emitting layer, and
a distance between a center in a widthwise direction of the light-emitting region and a side surface of the light-emitting layer on the electromagnetic wave producing portion side is smaller than a width of the light-emitting region.

According to the above-mentioned embodiment, the electromagnetic wave producing portion is located on the side of the light-emitting layer, and the distance between the center in the widthwise direction of the light-emitting region of the light-emitting layer and the side surface of the light-emitting layer is smaller than the width of the light-emitting region. Therefore, the evanescent wave that serves as a high-intensity electromagnetic wave is effectively produced from the laser light from the light-emitting layer by the electromagnetic wave producing portion.

In one embodiment, the optical device further comprising:
a low refractive index layer that is put in contact with the light-emitting layer and has a refractive index lower than a refractive index of the light-emitting layer, the electromagnetic wave producing portion is formed at the low refractive index layer.

According to the above-mentioned embodiment, the evanescent wave is highly effectively produced from the laser light, which is generated in the light-emitting layer and made incident on the interface between the light-emitting layer and the low refractive index layer, via the electromagnetic wave producing portion.

In one embodiment, the optical device further comprising:
a low refractive index layer that is put in contact with the light-emitting layer and has a refractive index lower than a refractive index of the light-emitting layer, the low refractive index layer having a thickness smaller than a distance of leak of an electromagnetic wave leaking toward the low refractive index layer side when light from the light-emitting layer side is totally reflected on an interface where the light-emitting layer and the low refractive index layer are put in contact with each other;

a shield layer for shielding the electromagnetic wave leaked from the interface where the light-emitting layer and the low refractive index layer are put in contact with each other, the shield layer being provided on a side of the low refractive index layer, the side being opposite from the side put in contact with the light-emitting layer; and the electromagnetic wave producing portion is formed at the shield layer.

According to the above-mentioned embodiment, when the laser light generated in the light-emitting layer is made incident and totally reflected on the interface between the light-emitting layer and the low refractive index layer, the evanescent wave as the electromagnetic wave is leaked from the interface to the low refractive index layer. The thickness of the low refractive index layer is formed smaller than the distance of leak of the evanescent wave in this low refractive index layer. Therefore, the evanescent wave leaks to the surface opposite from the side of this low refractive index layer put in contact with the light-emitting layer, and this leaked evanescent wave is effectively produced from the electromagnetic wave producing portion provided at the shield layer. Since the low refractive index layer has a thickness smaller than the distance of leak of the evanescent wave, an evanescent wave of a comparatively great intensity is produced from the electromagnetic wave producing portion.

In one embodiment, the electromagnetic wave producing portion is provided with a metal film that has a prescribed thickness.

According to the above-mentioned embodiment, by arranging the metal film that has the prescribed thickness in the electromagnetic wave producing portion and applying the evanescent wave to this metal film, a surface plasmon is excited on the metal film. By obtaining surface plasmon resonance by the surface plasmon and the evanescent wave, the intensity of the evanescent wave is effectively increased. Since the optical device of the present embodiment produces the evanescent wave by the p-polarized laser light at the electromagnetic wave producing portion, the surface plasmon can be excited on the metal film. In this case, the metal film should preferably have a thickness smaller than the penetration depth of the evanescent wave in the metal that forms this metal film.

In one embodiment, the electromagnetic wave producing portion is provided with a metal particle that has a prescribed diameter.

According to the above-mentioned embodiment, the metal particle that has the prescribed diameter is arranged at the electromagnetic wave producing portion, and the evanescent wave is applied to this metal particle. By this operation, by exciting the surface plasmon in the metal particle and obtaining the surface plasmon resonance by this surface plasmon and the evanescent wave, the intensity of the evanescent wave is effectively increased. Since the optical device of the present embodiment produces the evanescent wave by the p-polarized laser light at the electromagnetic wave producing portion, the surface plasmon can be excited on the metal particle. In this case, the metal particle should preferably have a diameter smaller than the wavelength of the laser light.

The present invention also provides an optical sensor comprising:

the optical device of the present invention; and the optical device detecting a state of an object to be measured by measuring a threshold current of laser oscillation in the light-emitting layer in a state in which the electromagnetic wave producing portion of the optical device and the object to be measured are brought close to each other.

According to the above-mentioned construction, the evanescent wave as the electromagnetic wave is generated at the electromagnetic wave producing portion in the state in which the electromagnetic wave producing portion of the optical device is brought close to the object to be measured. At this time, when the object to be measured has, for example, electric polarization, the threshold current of laser oscillation in the light-emitting layer changes in comparison with this case where this electric polarization is not present. By measuring the change in this threshold current, the existence of the electric polarization is detected. Moreover, items to be detected are not limited to the existence of this electric polarization but include the direction of the electric polarization, the intensity of the electric polarization and so on. Moreover, the existence of the evanescent wave in the object to be measured, the intensity of this evanescent wave and so on are also detected.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
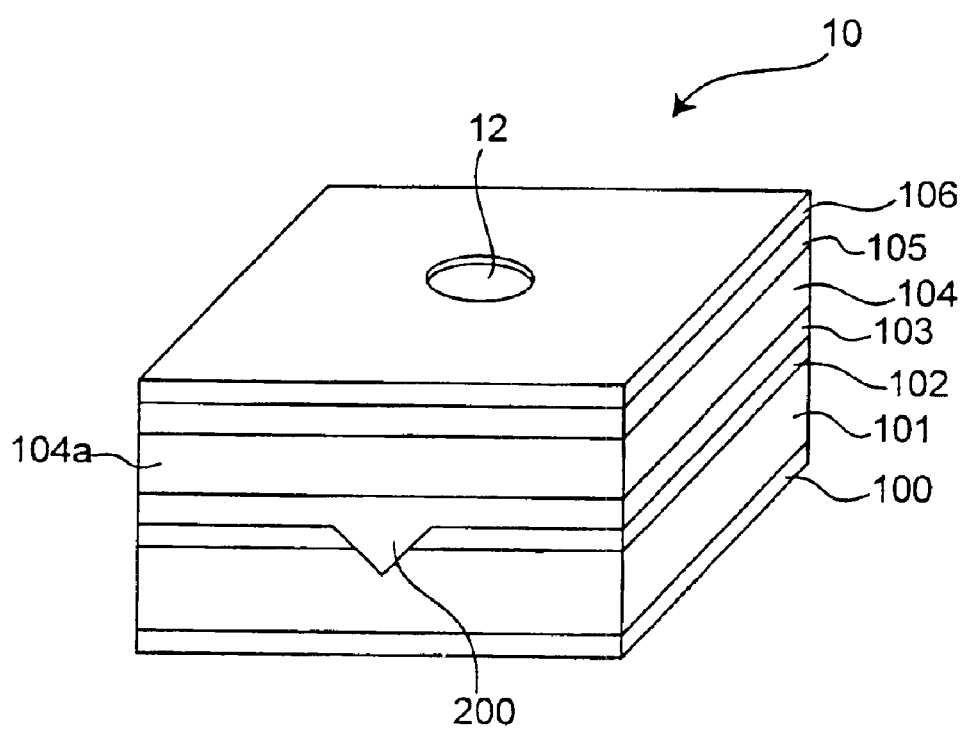
FIG. 1 is a perspective view showing the optical device of a first embodiment of the present invention.

The present invention will be described in detail below on the basis of the embodiments shown in the drawings.

(First Embodiment)

FIG. 1 is a perspective view showing the optical device of the first embodiment of the present invention. This optical device 10 is constituted by employing a semiconductor laser device that has a VSIS (V-channeled Substrate Inner Stripe) structure. This optical device 10 has a p-Au electrode 100, a p-GaAs substrate 101, n-GaAs current confinement layers 102, a p-$Al_xGa_{1-x}As$ ($0 \leq x \leq 1$) lower cladding layer 103, a p-$Al_xGa_{1-x}As$ ($0 \leq x \leq 1$) active layer 104 that serves as a light-emitting layer, an n-$Al_xGa_{1-x}As$ ($0 < x \leq 1$) upper cladding layer 105 and an n-Au electrode 106 in this order from the lower side in FIG. 1. The current confinement layers 102 are formed on both sides in the widthwise direction with interposition of a prescribed interval, and a stripe portion 200 of the lower cladding layer 103 is formed between the current confinement layers 102 located on both sides in the widthwise direction. This stripe portion 200 of the lower cladding layer 103 has a roughly inverted triangular cross-section shape and extends in the depthwise direction while being located roughly at the center in the widthwise direction of the optical device. A laser resonator is formed of an end face 104a located on this side and an end face located on the rear side of the active layer 104 in FIG. 1. An aperture 12 that serves as an electromagnetic wave producing portion is provided roughly at the center in the widthwise direction and at the center in the depthwise direction of the n-electrode 106. It is to be noted that the suffix x of the p-cladding layer 103, the active layer 104 and the n-cladding layer 105 is set so as to satisfy a refractive index condition described later individually for each of the layers.

Figure 2A:
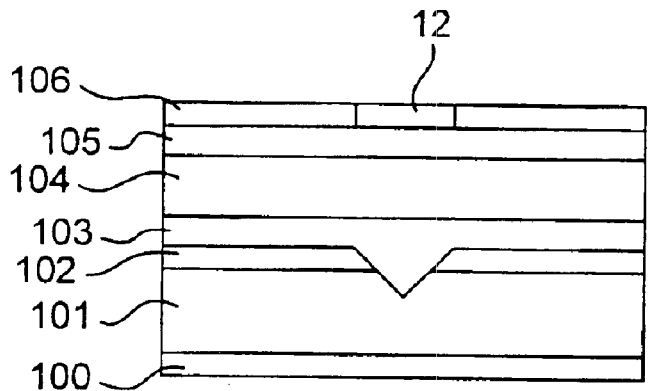
FIG. 2A is a sectional view roughly at the center in the depthwise direction of the optical device of FIG. 1.

FIG. 2A is a sectional view roughly at the center in the depthwise direction of the optical device 10. That is, the figure is a sectional view of the optical device 10 roughly at the center between the two end faces that constitute the resonator of the active layer 104. As shown in FIG. 2A, the aperture 12 is located roughly at the center in the widthwise direction of the n-electrode 106. This aperture 12 internally has a refractive index equal to the refractive index of air, the refractive index being smaller than the refractive index of the electrode 106 that is the surrounding portion of this aperture 12. Moreover, this aperture 12 has a diameter of 223 nm obtained by dividing the wavelength λ of 780 μm of laser light generated by the active layer 104 by the refractive index $n_2$ of 3.5 of the active layer 104.

Figure 2B:
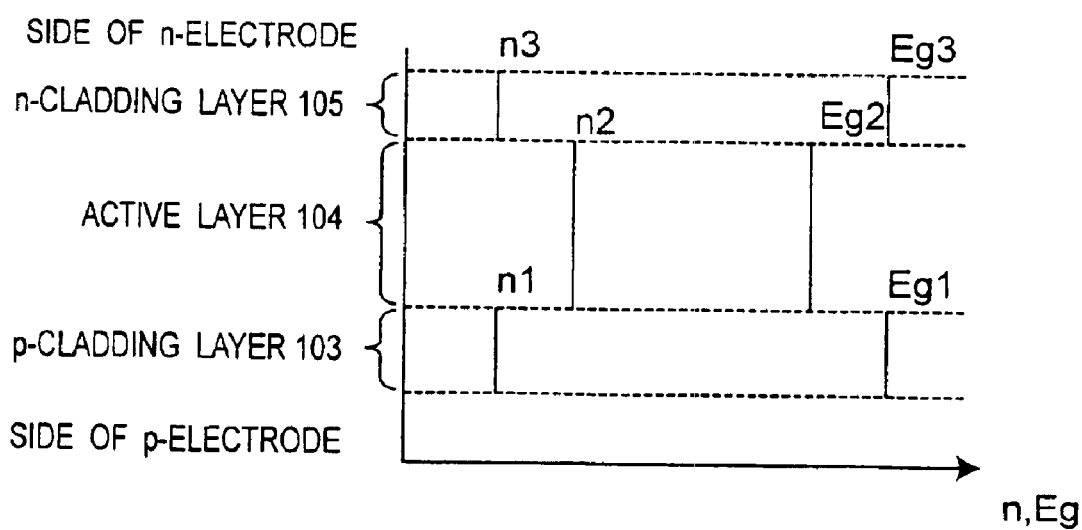
FIG. 2B is a view showing the distributions of the bandgaps and the refractive indexes of the layers of FIG. 2A.

FIG. 2B is a view showing the distributions of a bandgap Eg and the refractive index n of the semiconductors of the p-cladding layer 103, the active layer 104 and the n-cladding layer 105. The laser light generated in the active layer 104 is confined in the thickness direction of the active layer 104, while evanescent light leaks to the upper cladding layer 105 above this active layer 104 and to the lower cladding layer 103 below the active layer 104. Moreover, supply of a current to the stripe portion 200 of the lower cladding layer 103 is limited by the current confinement layer 102. Consequently, laser light is generated roughly at the center in the widthwise direction of the active layer 104 so as to be located above the stripe portion 200, forming a stripe-shaped light-emitting region.

Laser light in TE mode that has an electric field vector directed in the widthwise direction of this active layer 104 and laser light in TM mode that has an electric field vector directed in the thickness direction of this active layer 104 are generated in the active layer 104. Assuming that the active layer 104 has a thickness of 2a, the laser light in the TE mode and the laser light in the TM mode are distributed in the thickness direction of the active layer 104 as expressed by the following expressions.

$$TE_{even} \quad A_e\cos(\kappa x) \quad (|x| < a), \quad A_e\cos(\kappa a)e^{-\gamma(|x|-a)} \quad (|x| \geq a)$$

$$TE_{odd} \quad A_o\sin(\kappa x) \quad (|x| < a), \quad \frac{x}{|x|}A_o\sin(\kappa a)e^{-\gamma(|x|-a)} \quad (|x| \geq a)$$

$$TE_{even} \quad B_e\cos(\kappa x) \quad (|x| < a), \quad B_e\cos(\kappa a)e^{-\gamma(|x|-a)} \quad (|x| \geq a)$$

$$TE_{odd} \quad B_o\sin(\kappa x) \quad (|x| < a), \quad \frac{x}{|x|}B_o\sin(\kappa a)e^{-\gamma(|x|-a)} \quad (|x| \geq a)$$

In the above expressions, κ represents a propagation constant in the thickness direction of the active layer 104, and γ represents a propagation constant in the thickness direction of the lower cladding layer 103 and the upper cladding layer 105. The reciprocal of γ is a distance of leak of the evanescent light to the upper and lower cladding layers 105 and 103.

In this case, laser modes in the laser oscillation state are expressed by the following expressions.

$$V^2 = (\kappa a)^2 + (\gamma a)^2, \quad V = k_0 a \sqrt{n_2^2 - n_3^2}$$

$$TE_{even} \quad \tan(\kappa a) = \gamma a / \kappa a$$

$$TE_{odd} \quad \tan(\kappa a) = -\kappa a / \gamma a$$

$$TM_{even} \quad \tan(\kappa a) = (n_2/n_3)^2 \frac{\kappa a}{\kappa a}$$

$$TM_{odd} \quad \tan(\kappa a) = -(n_3/n_2)^2 \frac{\kappa a}{\gamma a}$$

Figure 3:
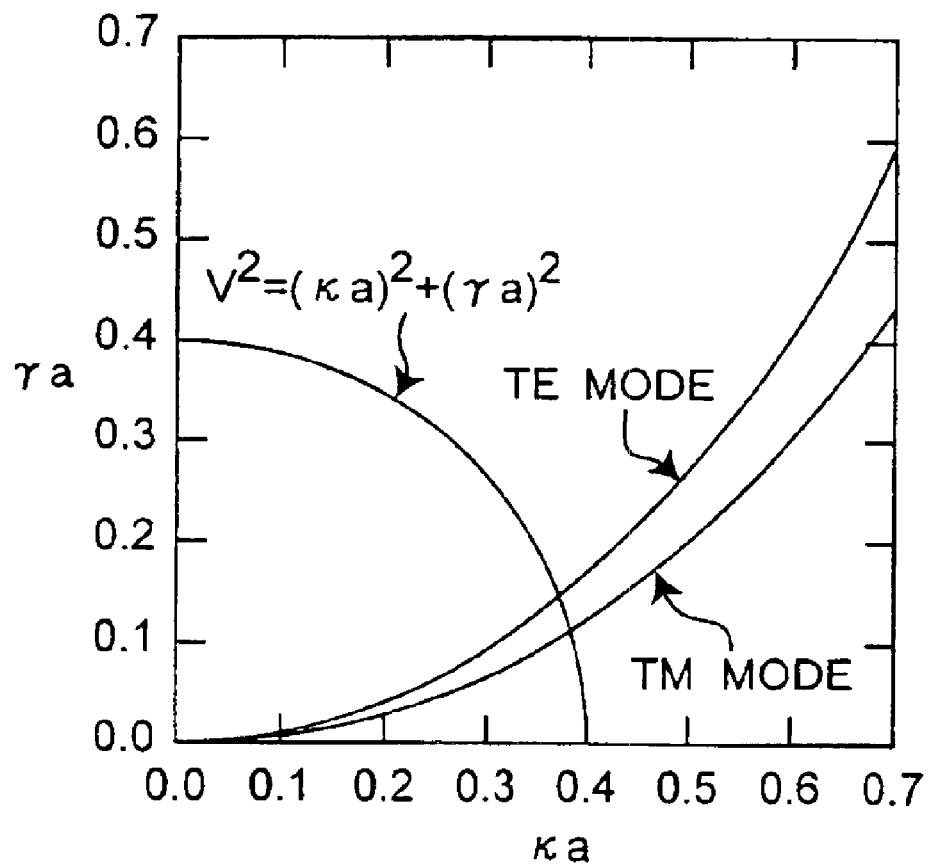
FIG. 3 is a graph showing curves of laser modes of the optical device.

In the above expressions, $k_0$ represents the propagation constant of light of a wavelength λ in a vacuum. FIG. 3 shows curves representing the aforementioned laser modes, where the intersections of the curves become κa and γa in each mode, according to which κ and γ are determined. In the case of an asymmetric waveguide in which the refractive indexes of the upper and lower cladding layers 105 and 103 are different from each other, the position of the maximum value of laser intensity shifts from the center of the active layer 104 depending on the refractive indexes of the upper and lower cladding layers 105 and 103. Therefore, by properly setting the refractive indexes of the upper and lower cladding layers 105 and 103, the amount of leak of light from the active layer 104 to the upper and lower cladding layers 105 and 103 can be controlled.

If the active layer 104 has a refractive index $n_2$ of 3.5, a thickness 2a of 100 nm and a laser wavelength λ of 780 nm and the upper and lower cladding layers 105 and 103 have a refractive index $n_3$ of 3.0, then the distance of leak of the evanescent light to the upper and lower cladding layers 105 and 103 is as follows. That is, the oscillations in the TE mode and the TM mode occur in the active layer 104. According to the equation: γa=0.144 in the TE mode and γa=0.114 in the TM mode, the distance of leak of the laser light in the TE mode becomes 347 nm, and the distance of leak of the laser light in the TM mode becomes 440 nm. In this case, assuming that the electric field component at the boundary between the active layer 104 and the upper cladding layer 105 or the lower cladding layer 103 is one, then the distance of leak means a distance from the boundary when the electric field component of the leaked light becomes $e^{-1}$ to 0.368 in the upper cladding layer 105 or the lower cladding layer 103. An incidence angle θ (θ=π/2−φ) of the laser light with respect to the tangent of the interface is about 15° (φ=85°) in either the TE mode or the TM mode, and a propagation constant β in a plane parallel to the interface is obtained from the equation: $\beta^2 = k_0^2 n_2^2 - \kappa^2$. According to the refractive index $n_2$ of the active layer 104 and the refractive index $n_3$ of the upper and lower cladding layers 105 and 103, this propagation constant β becomes $k_0 n_3 \leq \beta < k_0 n_2$. If the laser oscillation mode in the active layer 104 comes to have a higher order, then the quantity of light leaking to the upper and lower cladding layers 105 and 103 increase with an increase in the distance of leak, increasing the intensity of the evanescent wave.

Figure 4A:
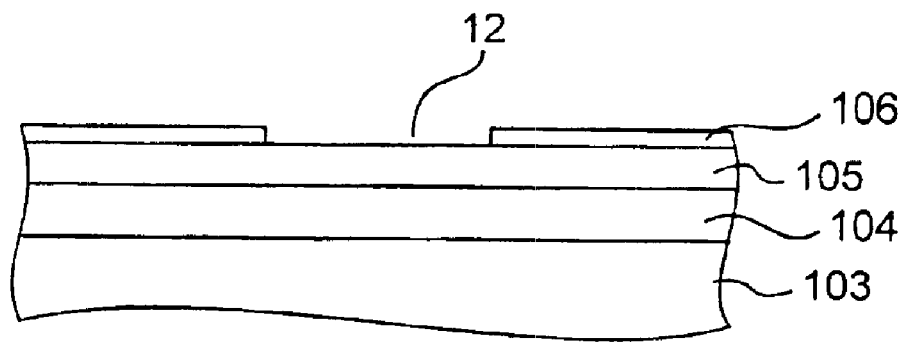
FIG. 4A is a sectional view showing the neighborhood of an aperture where an evanescent wave is produced.
Figure 4B:
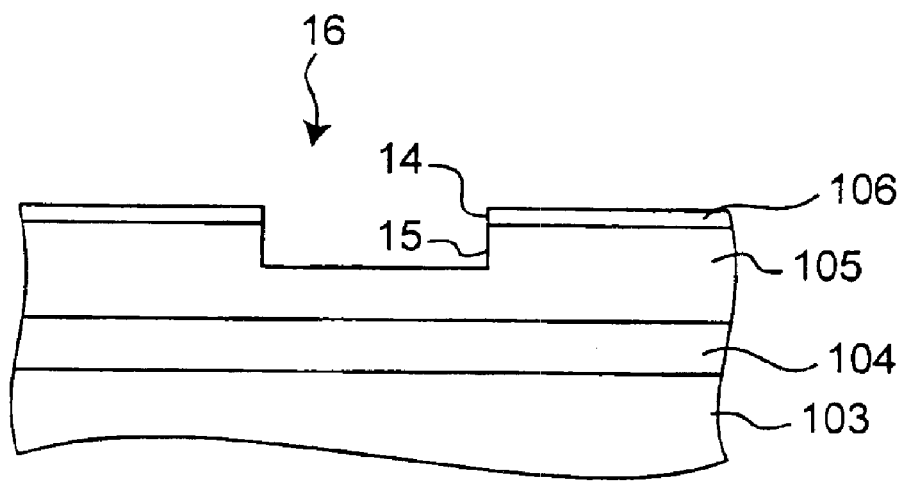
FIG. 4B is a sectional view showing a modification example of an electromagnetic wave producing portion.

FIGS. 4A and 4B show sectional views showing the neighborhood of the aperture 12 from which the evanescent wave is produced. The layer thickness of the upper cladding layer 105 is set to a thickness almost equal to the distance of leak of light from the active layer 104, and the aperture 12 is formed in the portion, from which the evanescent wave is produced, of the n-electrode 106 located on the surface of the upper cladding layer 105. That is, the n-electrode 106 is used concurrently as a shield layer of the evanescent wave. With this arrangement, the evanescent wave is produced from the prescribed region located on the electrode side. In order to shield this evanescent wave, the n-electrode 106 is required to be formed thicker than the penetration depth of the evanescent wave. In the metal film that forms this n-electrode 106, assuming that the complex refractive index of this metal is $N_{metal} = n_{metal} + ik_{metal}$, then the condition of the penetration of the evanescent wave into this metal film and a penetration depth d of the evanescent wave into this metal are expressed by the following expressions. In this case, ni (ki to 0) represents the refractive index of the layer on which the evanescent wave is incident, and φ represents the incidence angle of the evanescent wave on the metal film.

$$n_i^2 \sin^2\phi - k_{metal}^2 + n_{metal}^2 < 0$$

$$d = \frac{\lambda}{2\pi} \sqrt{k_{metal}^2 + 2n_{metal}k_{metal} - n_{metal}^2 - n_i^2 \sin^2\phi}$$

If the emission wavelength λ of the active layer 104 is 780 nm and the incidence angle φ is 85°, then the penetration depth d is about 450 nm in the case of a metal of Au, Ag or the like, of which the refractive index is smaller than one and the extinction coefficient is greater than three. In the case of a metal of Pt, Al, Pd or the like, of which the refractive index is greater than one and the extinction coefficient is greater than three, the penetration depth d is about 770 nm, which is almost equal to the wavelength λ of the laser light. As described above, by making the thickness greater than the penetration depth d according to the kind of the metal that constitutes the n-electrode 106, this electrode 106 can be made to effectively function as a shield layer to prevent the evanescent wave from leaking from the portion other than the aperture 12.

FIG. 4B is a sectional view showing a modification example of the electromagnetic wave producing portion. In this modification example, the upper cladding layer 105 is formed so as to have a thickness of not smaller than the distance of leak of light of the active layer 104. Then, an aperture 14 is provided in a position from which the evanescent wave of the n-electrode 106 is to be produced, and a recess portion 15, which communicates with this aperture 14, is formed on the upper cladding layer 105. A light producing portion 16 as the electromagnetic wave producing portion is formed of the aperture 14 and the recess portion 15.

The recess portion 15 of the light producing portion 16 is formed so that the thickness of the upper cladding layer 105 at the bottom of this recess portion 15 becomes smaller than the distance of leak of light of the active layer 104. With this arrangement, the evanescent wave generated at the interface between the active layer 104 and the upper cladding layer 105 leaks from the bottom the recess portion 15 and is produced from the aperture 14 that communicates with this recess portion to the outside of the optical device. With regard to the light producing portion 16 of FIG. 4B, this light producing portion 16 has a refractive index equal to the refractive index of air, the refractive index being smaller than the refractive index of the electrode 106 that is the surrounding portion of this light producing portion 16 and the upper cladding layer 105.

In obtaining the evanescent wave from light that is totally reflected on the prescribed interface, the intensity of this evanescent wave depends on the polarization direction of light made incident on the interface. That is, if polarized light, which has an electric field vector component perpendicular to the interface, is made incident on the interface, then there can be obtained an evanescent wave of an intensity about four orders of magnitude greater than when polarized light, which has an electric field vector component parallel to the interface, is made incident on the interface. In the optical device 10 of the present embodiment, assuming that the maximum intensity of the laser light at the center of the active layer 104 is one, then the intensity of leaked light at the interface between this active layer 104 and the upper cladding layer 105 toward the upper cladding layer 105, becomes $(\cos(\kappa a)e^{-1})^2$ to 0.1 on the assumption that this leaked light is an evanescent wave of a single wavelength in the TM mode. This intensity is intensity about three or more orders of magnitude greater than that of an evanescent wave obtained via a pinhole formed at a thin film arranged on the conventional laser light emitting end face.

In the present embodiment, the electrodes 100 and 106 may be formed of Ag, Cu, Al, Pt, Ti or the like besides Au. Although the light-emitting element of the present embodiment employs the VSIS type semiconductor laser, it is acceptable to employ a semiconductor laser of another type. Moreover, each of the components may be properly subjected to material change and shape modification.

(Second Embodiment)

Figure 5A:
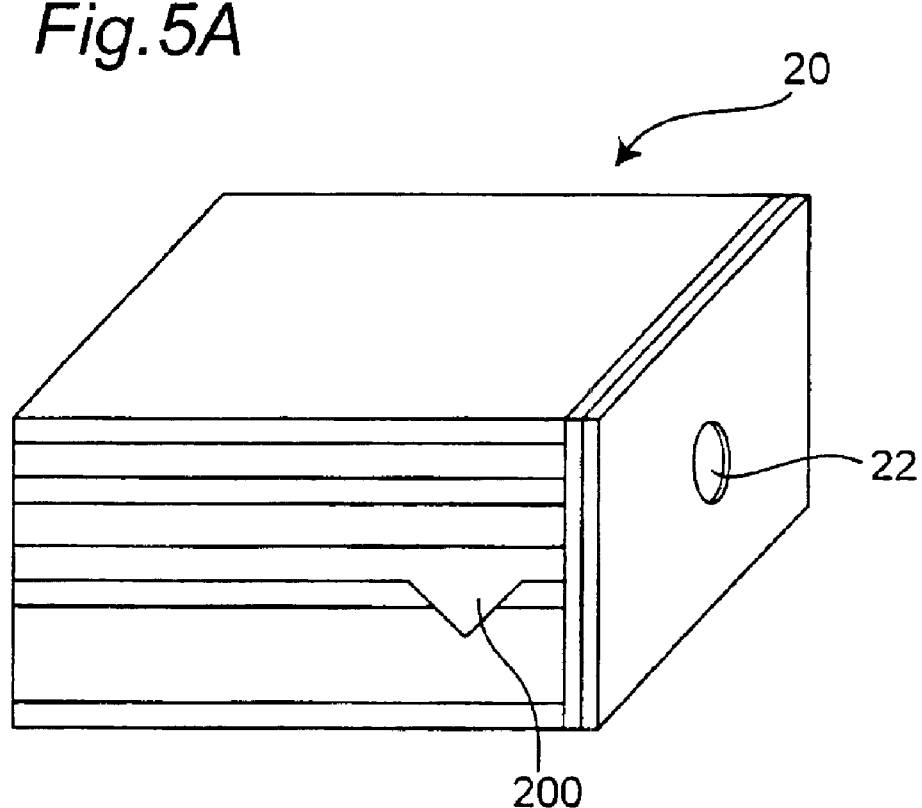
FIG. 5A is a perspective view showing an optical device of a second embodiment.
Figure 5B:
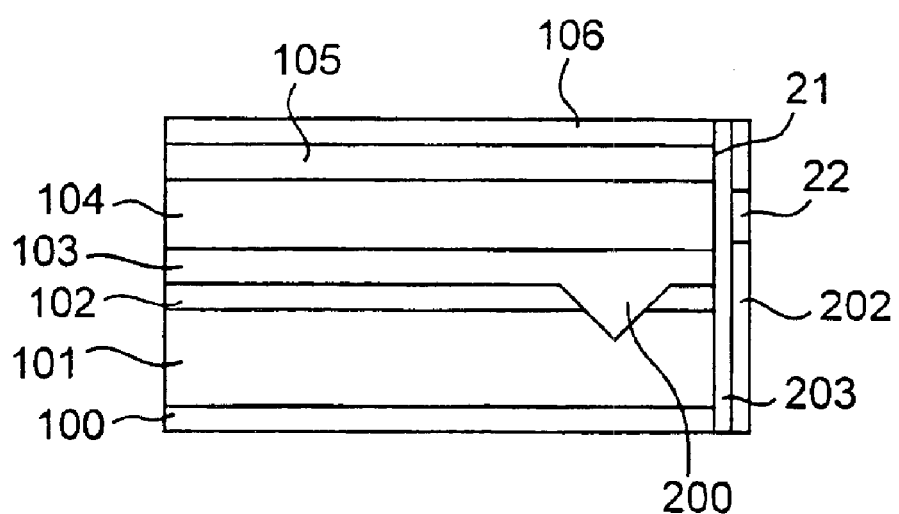
FIG. 5B is a sectional view roughly at the center in the depthwise direction of the optical device of FIG. 5A.

FIG. 5A is a perspective view showing the optical device of the second embodiment, and FIG. 5B is a sectional view roughly at the center in the depthwise direction of the optical device of the present embodiment. In the optical device 20 of the second embodiment, an aperture 22 that serves as an electromagnetic wave producing portion is arranged on a side of the active layer 104 that serves as a light-emitting layer. In the optical device 20 of FIGS. 5A and 5B, the same components as those of the optical device 10 of FIG. 1 are denoted by the same reference numerals, and no detailed description is provided therefor. As shown in FIGS. 5A and 5B, in the optical device 20 of the present embodiment, a stripe portion 200 of the lower cladding layer 103 is arranged near the side of the optical device 20. With this arrangement, a light-emitting region is formed in contact with the side of the optical device 20 at the active layer 104.

Then, an evanescent wave is generated by using the laser light in the TE mode out of the laser light generated in the light-emitting region. If the width of the stripe portion 200 of the lower cladding layer 103 is $2w_i$, then an electric field intensity at a distance r from the center in the widthwise direction of this stripe portion 200, i.e., the distance r from the center in the widthwise direction of the light-emitting region of the active layer 104 is expressed by the following expression. In this case, a carrier injection coefficient of the stripe portion 200 is assumed to be α. The width $2wi$ of the stripe portion 200 is the maximum width of the widths possessed by this stripe portion.

$$E(r) = E_0 \exp\left\{-\frac{1}{2}(r/\alpha w_i)^2\right\}$$

According to this expression, if the distance from the center of the stripe portion 200 to the side surface of the active layer 104 is formed to 1.41 μm when α is one and wi is 1 μm, then the electric field intensity on the side surface of this active layer 104 becomes $E0_e^{-1}$. Therefore, the intensity of the laser light on the side surface of this active layer 104 becomes about 0.1 times the intensity of the laser light at the center of the light-emitting region. If the distance from the center of the stripe portion 200 to the side surface of the active layer 104 is formed to 2 μm, then the intensity of the laser light on the side surface of this active layer 104 is disadvantageously reduced to about 0.02 times the intensity of the laser light at the center of the light-emitting region. Moreover, by changing the structure of the stripe portion 200 and changing the carrier injection coefficient α, the intensity of the laser light on the side surface of the active layer 104 can be reinforced.

Figure 6A:
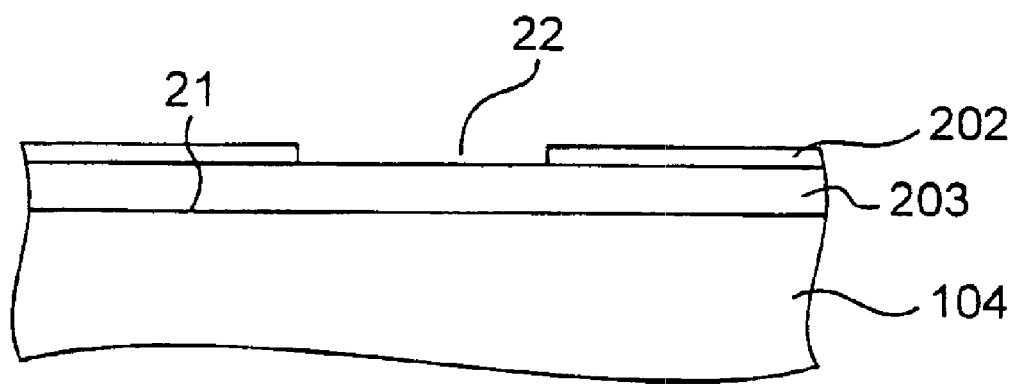
FIG. 6A is a view showing the neighborhood of an aperture as the electromagnetic wave producing portion.

When the laser light is totally reflected on the side surface of the active layer 104, the evanescent wave is generated. In order to produce this evanescent wave, the aperture 22 is arranged on the side of the active layer 104. FIG. 6A is an enlarged view of the neighborhood of the aperture 22. In FIG. 6A, the neighborhood of the aperture 22 is shown while being rotated counterclockwise by about 90°. As shown in FIGS. 5A, 5B and 6A, a metal film 202 is arranged as a shield layer on a side surface 21 of the optical device, and the aperture 22 is formed as an electromagnetic wave producing portion in a position of this metal film 202 corresponding to the active layer 104. The metal film 202 is formed to a thickness greater than the penetration depth of the evanescent wave similarly to the electrode 106 of the first embodiment, so that the evanescent wave does not leak from the portion other than the aperture 22. In order to prevent the occurrence of short-circuit between the electrodes 100 and 106 due to the metal film 202, an insulating layer 203 is provided between this metal film 202 and the side surface 21 of the optical device.

Figure 6B:
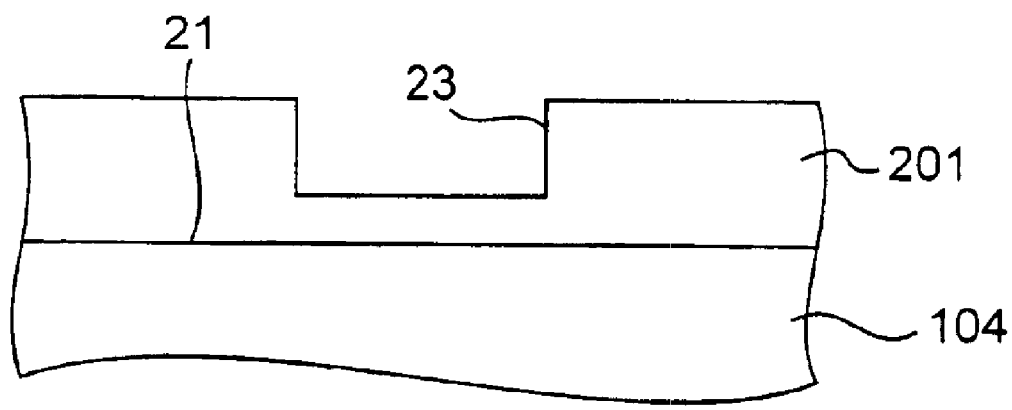
FIG. 6B is a view showing a modification example of the electromagnetic wave producing portion.

FIG. 6B is a view showing a modification example of the electromagnetic wave producing portion. According to this modification example, a low refractive index material 201 of a prescribed thickness is arranged on the side surface 21 of the optical device, and a recess portion 23 is formed in the position, in which the evanescent wave is to be produced, of this low refractive index material 201, constituting the electromagnetic wave producing portion. The low refractive index material 201 is constructed of a substance whose refractive index is lower than that of the active layer 104 and able to be constructed of $SiO_2$, $Al_2O_3$ or an organic substance of polycarbonate or the like. The penetration depth d of the evanescent wave in the low refractive index material 201 is expressed by the following expression:

$$d = \frac{\lambda}{2\pi}\sqrt{n_{high}^2 - n_{low}^2}$$

where $n_{high}$ represents the refractive index of the active layer 104, and $n_{low}$ represents the refractive index of the low refractive index layer 201. The penetration depth to this low refractive index material 201 increases as the refractive index of the low refractive index material 201 is smaller. If $n_{low}$=1.5, $n_{high}$=3.5 and λ=780 nm, then the penetration depth d is about 400 nm. In this case, the evanescent wave can be effectively produced from this recess portion 23 by forming the thickness of the low refractive index material 201 greater than 400 nm and forming the thickness at the bottom of the recess portion 23 smaller than 400 nm.

(Third Embodiment)

Figure 7A:
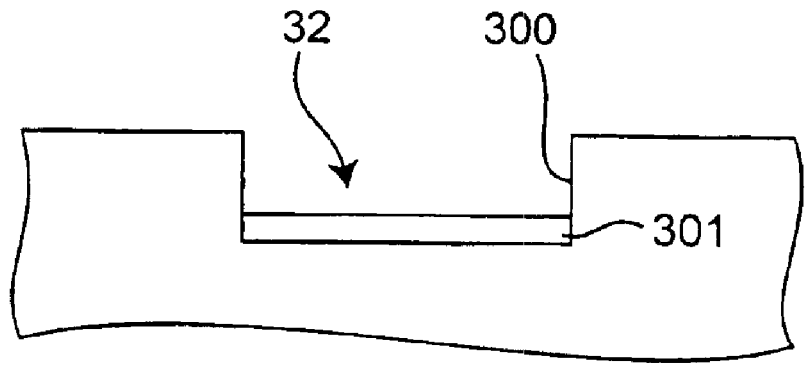
FIG. 7A is a sectional view showing the electromagnetic wave producing portion of an optical device of a third embodiment.

FIG. 7A is a sectional view showing the electromagnetic wave producing portion provided for the optical device of the third embodiment. The optical device of the present embodiment is the same as the optical devices of the first and second embodiments except for the electromagnetic wave producing portion. In the electromagnetic wave producing portion of the optical device of the present embodiment, a metal film 301 is provided in a recess portion 300, and a surface plasmon is excited on the surface of this metal film 301 by an evanescent wave, increasing the intensity of the evanescent wave. In a light producing portion 32 that serves as the electromagnetic wave producing portion of FIG. 7A, the metal film 301 is arranged so as to be put in contact with the bottom surface of the recess portion 300. The recess portion 300 may be formed on the upper cladding layer 105 of the first embodiment or formed on the low refractive index material 201 of the second embodiment. The metal film 301 is constructed of a metal of Au, Ag, Cu, Al, Pt, Ti or the like, of which the real part ∈r of the dielectric constant becomes −10 or less in the visible light range. This is because a condition of $\in_r + \in_{LD} < 0$ must hold between the real part ∈r of the dielectric constant of the metal film 301 and the dielectric constants $\in_{LD}$ ($\in_{LD}=n^2$, and n=3.0 to 3.5) of the active layer 104 or the cladding layer 105 in order to excite a surface plasmon on the metal film 301. The metal film 301 should preferably have a thickness of not higher than the penetration depth of the evanescent wave in the metal film described in connection with the first embodiment. In particular, by setting the thickness of the metal film 301 to 50 nm or less, the evanescent wave reaches the surface on the side remote from the active layer of the metal film 301, allowing a surface plasmon to be effectively excited on this surface.

Figure 8:
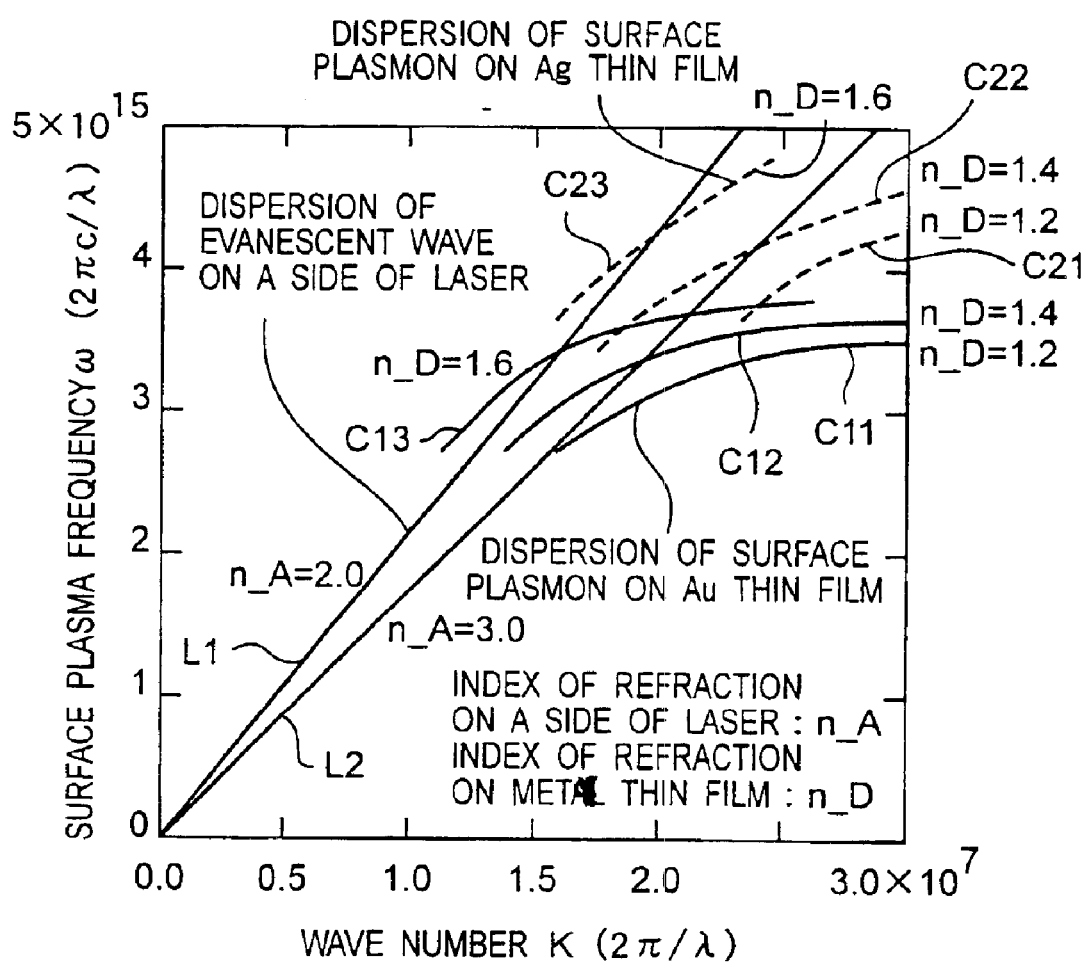
FIG. 8 is a graph showing the relation of dispersion between the evanescent wave and the surface plasmon.

FIG. 8 is a graph showing the relation of dispersion between the evanescent wave and the surface plasmon. In FIG. 8, the vertical axis represents a surface plasma frequency ω (2πc/λ), and the horizontal axis represents the wave number K (2π/λ). In FIG. 8, the straight lines L1 and L2 represent the relations of dispersion of the evanescent wave leaked from the active layer where the laser light is generated when a refractive index n_A of the active layer 104 is 2.0 and 3.0, respectively. The curves C11, C12 and C13 represent the relations of dispersion of the surface plasmon generated on the surface of the metal film 301 when a refractive index n_D of the portion put in contact with the surface of this metal film 301 is 1.2, 1.4 and 1.6, respectively. The curves C21, C22 and C23 represent the relations of dispersion of the surface plasmon generated on the surface of a silver thin film when the refractive index n_D in the portion put in contact with the surface of this silver film is 1.2, 1.4 and 1.6, respectively. At the intersections of the straight lines L1 and L2 and the curves C11 through C23, the evanescent wave and the surface plasmon have coinciding frequency ω and wave vector K, enabling the excitation of the surface plasmon by the evanescent wave. Therefore, complex dielectric constants $\in_3$ and $\in_4$ (ω) of the wavelength of the laser light generated in the active layer 104, the active layer 103, the cladding layer 105, the metal film 301 and a low refractive index film 302 (dielectric constant $\in=n_2$) arranged on the surface of this metal film 301 are set so that the evanescent wave and the surface plasmon on the metal film 301 have coinciding frequency ω and wave vector K. The above-mentioned relations of dispersion between the evanescent wave and the surface plasmon are expressed by the following expressions.

$$\omega_E = \frac{c}{\sqrt{\varepsilon_3}\sin\phi} K_E$$

$$K_{SP}(\omega) = \frac{\omega}{c}\sqrt{\frac{\varepsilon_4(\omega)\varepsilon_3}{\varepsilon_4(\omega)+\varepsilon_3}}$$

Surface plasmon resonation is caused by the evanescent wave under the condition that the dispersion of the surface plasmon and the dispersion of the evanescent wave intersect each other, allowing the intensity of the evanescent wave to be increased by about two hundred times. The excitation of the surface plasmon on the metal film 301 is caused by the p-polarized light whose electric field vector component is roughly perpendicular to this metal film 301. Therefore, the pinhole formed on the resonator end face of the conventional semiconductor laser produces s-polarized light, and therefore, it is almost impossible to excite a surface plasmon even if a metal film is arranged at this pinhole. In contrast to this, the optical device of the present invention produces the evanescent wave of p-polarized light by the electromagnetic wave producing portion directed roughly perpendicularly to the resonator. Therefore, the intensity of the evanescent wave can be largely reinforced by the surface plasmon resonance by causing the excitation of the surface plasmon on the metal film provided at the electromagnetic wave producing portion.

Figure 7B:
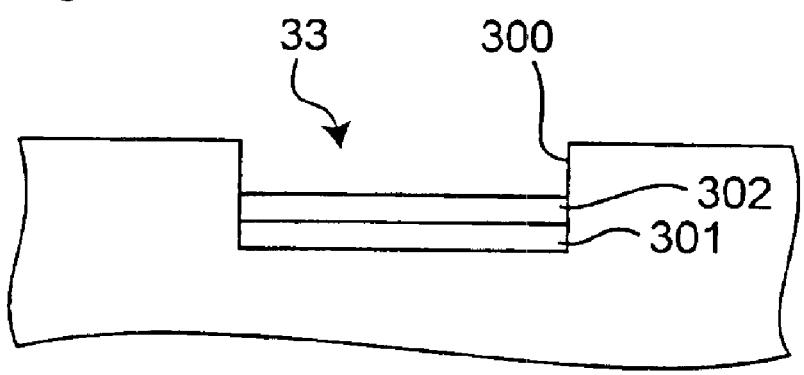
FIG. 7B is a sectional view showing a modification example of the electromagnetic wave producing portion.

FIG. 7B is a view showing a light producing portion 33 that serves as an electromagnetic wave producing portion where a low refractive index film 302 is arranged on the side of emission of the evanescent wave in contact with the metal film 301. The low refractive index film 302 should preferably have a refractive index $n_5$ smaller than the refractive index $n_2$ of the active layer 104. This is because the excitation of the surface plasmon is not caused by light from inside the prescribed film at the interface between the metal film 301 and the prescribed film put in contact with this metal film 301. That is, the above is because the dispersion of light in the prescribed film put in contact with the metal film 301 and the dispersion of the surface plasmon at the interface intersect each other only at the point K=0 in the coordinates of FIG. 8. In order to excite a surface plasmon at the interface between the metal film 301 and the prescribed film, the evanescent wave from the substance that has a refractive index greater than the refractive index of the prescribed film is required to be made incident on the interface. For example, when the metal film 301 is formed of Au, this metal film 301 is put in contact with the low refractive index film 302 whose refractive index is 1.4, and the surface on the side on which the evanescent wave is made incident is put in contact with a high-refractive-index substance that has a refractive index of 3.5. With this arrangement, a surface plasmon can be excited at the interface between the metal film 301 and the low refractive index film 302 by the evanescent wave produced from the laser light of a wavelength λ=780 nm.

Figure 7C:
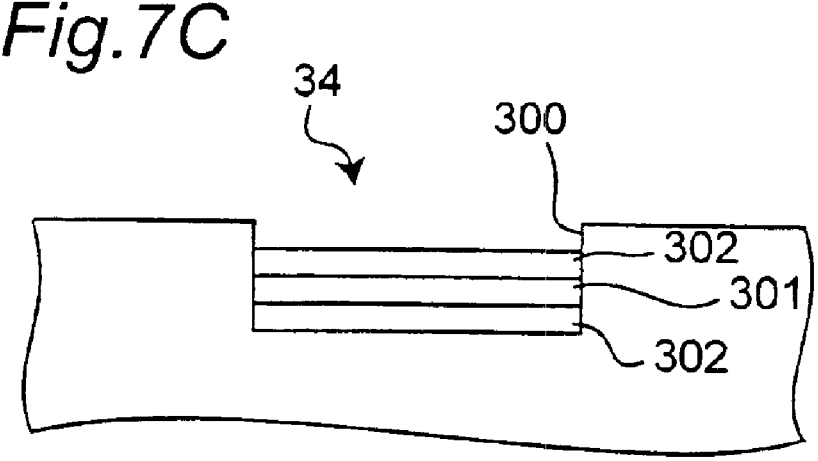
FIG. 7C is a sectional view showing another modification example of the electromagnetic wave producing portion.

Moreover, as shown in FIG. 7C, it is acceptable to form a light producing portion 34 by arranging low refractive index films 302 and 302 on both sides of the metal film 301. In this case, two interfaces are formed between the metal film 301 and the low refractive index film 302, and two excitation modes are caused by mutual coupling of the surface plasmons excited at the respective two interfaces. At this time, the electric polarization of the surface plasma energy shifts into parallel ω_ and antiparallel ω₊ with respect to the metal film 301. Therefore, in order to excite the coupled two modes, the wavelength of the laser light generated in the active layer 104 is required to be adjusted by a wavelength corresponding to the amount of the energy shift. The amount of the energy shift is obtained by the following expression:

$$\omega_\pm = \omega_s\sqrt{1\pm\exp(-k_{metal}\cdot d_{metal})}$$

where ωS represents the surface plasma frequency before coupling, $k_{metal}$ represents the attenuation constant of the evanescent wave in the metal film 301, and $d_{metal}$ represents the film thickness of the metal film 301.

FIGS. 9A, 9B and 9C and FIGS. 10A, 10B and 10C are views showing modification examples of the electromagnetic wave producing portion.

Figure 9A:
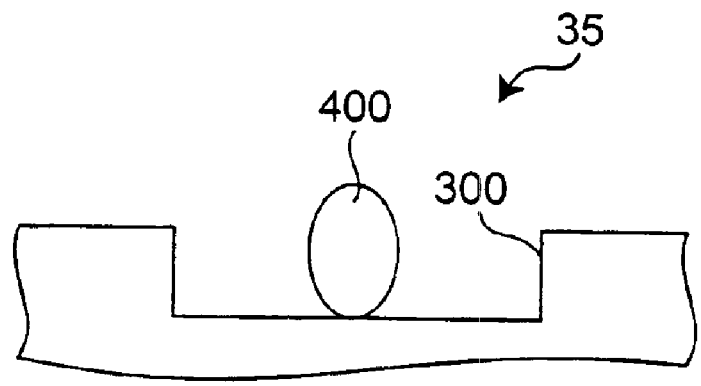
FIGS. 9A, 9B and 9C are views showing modification examples of the electromagnetic wave producing portion.

FIG. 9A is a view showing a light producing portion 35 that serves as an electromagnetic wave producing portion constructed by providing a metal particle 400 in the recess portion 300 in place of the metal film. This light producing portion 35 excites a local surface plasmon on the metal particle 400 by the evanescent wave leaked from the bottom of the recess portion 300, thereby reinforcing the intensity of the evanescent wave. In order to excite a local surface plasmon on the metal particle 400, the diameter of this metal particle 400 is required to be smaller than the wavelength of laser light, and in particular, a diameter of not greater than 100 nm is preferable. The metal particle 400 is formed of Au, Ag, Cu, Al, Pt, Ti or the like. The shape of the metal particle 400 should preferably have an oval cross-section shape, by which the degree of electric polarization by local surface plasmon excitation is further increased, allowing the intensity of the evanescent wave to be further reinforced. The relation of dispersion of the local surface plasmon is constant regardless of the propagation coefficient and forms discrete excitation levels. Among these, the mode in which the energy level is the lowest is called the Frohlich mode, according to which there holds the relation expressed by the following expression:

$$\omega_{lsp} = \frac{\omega_p}{\sqrt{1+2\varepsilon_{low}}}$$

where $\omega_{1sp}$ represents the local surface plasma frequency, $\omega_p$ represents the plasma frequency of the metal that constitutes the particle, and $\in_{low}$ represents the dielectric constant of the dielectric substance put in contact with the metal particle. In the coordinates similar to those of FIG. 8, the local surface plasmon excitation occurs at the point at which the dispersion of the evanescent wave leaked from the bottom of the recess portion 300 and the dispersion of the local surface plasmon on the metal particle 400 intersect each other, by which the intensity of the evanescent wave is effectively reinforced around the metal particle 400.

Figure 9B:
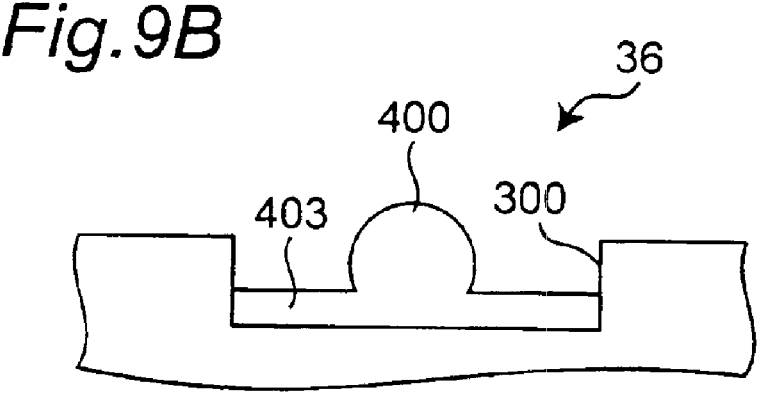

FIG. 9B is a view showing a light producing portion 36 that serves as an electromagnetic wave producing portion where a metal film 403 is arranged in the recess portion 300 in addition to the metal particle 400. In this light producing portion 36, the local surface plasmon excited on the metal particle 400 is coupled with the surface plasmon excited on the metal film 403, by which the excitation energy shifts to the lower energy side and to the higher energy side. Therefore, in order to cope with the excitation energy shifted to this low energy side, the wavelength of the laser light generated in the active layer 104 is required to be made longer than that before the coupling of the local surface plasmon of the metal particle 400 with the surface plasmon of the metal film 403. The shape of the metal particle 400 may have a circular cross-section shape or an oval cross-section shape.

Figure 9C:
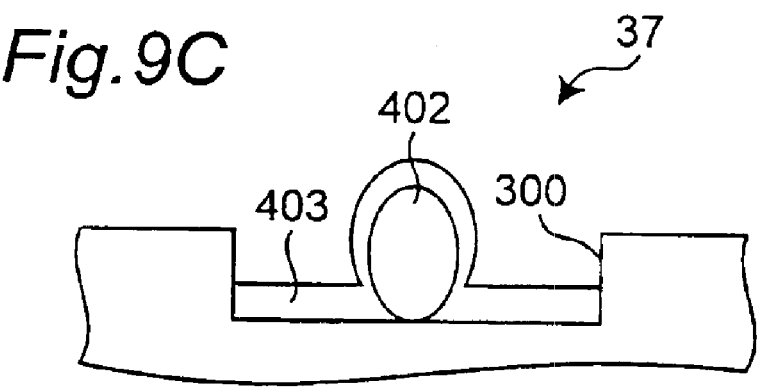

FIG. 9C is a view showing a light producing portion 37 that serves as an electromagnetic wave producing portion constructed by arranging a dielectric particle 402 of an oval cross-section shape and a metal film 403 that covers the surface of this dielectric particle 402 and the bottom surface of the recess portion 300 in the recess portion 300. The dielectric particle 402 has a diameter of not greater than 100 nm, and the metal film 403 has a thickness of not greater than 50 nm. The dielectric particle 402 should preferably be constructed of an organic substance of polystyrene or the like, which has a low dielectric constant.

Figure 10A:
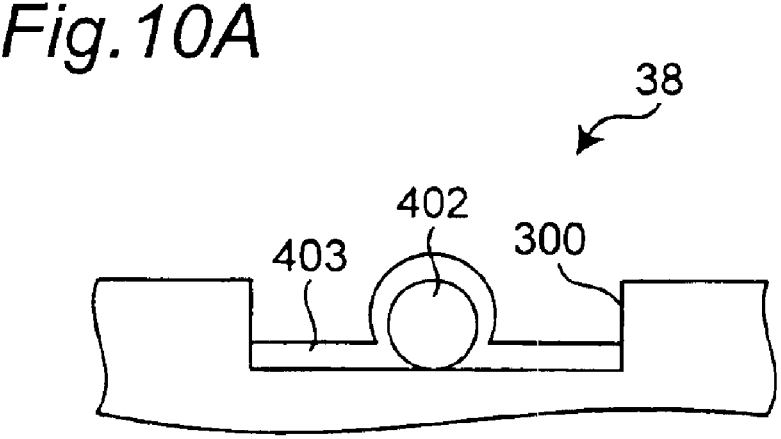
FIGS. 10A, 10B and 10C are views showing modification examples of the electromagnetic wave producing portion.

FIG. 10A is a view showing a light producing portion 38 that serves as an electromagnetic wave producing portion constructed by arranging a dielectric particle 402 of a circular cross-section shape and a metal film 403 that covers the surface of this dielectric particle 402 and the bottom surface of the recess portion 300 in the recess portion 300.

Figure 10B:
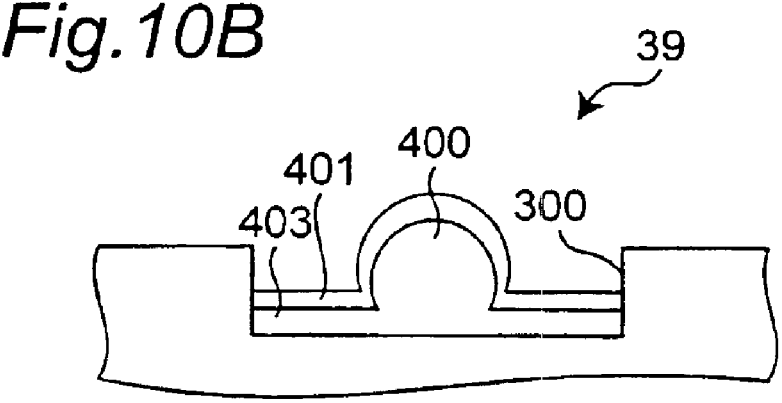
Figure 10C:
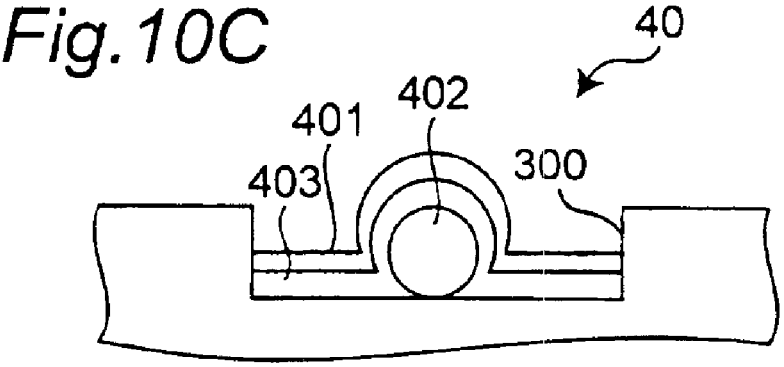

FIG. 10B is a view showing a light producing portion 39 that serves as an electromagnetic wave producing portion where a low refractive index film 401 is arranged on the surfaces of the metal particle 400 and the metal film 403 of FIG. 9B. This low refractive index film 401 has a refractive index smaller than the refractive index of the active layer 104 similarly to the low refractive index film 302 in the light producing portion 32 of FIG. 7B. A local surface plasmon can be effectively excited at the interface between the low refractive index film 302 and the metal particle 400, and a surface plasmon can be effectively excited at the interface between the low refractive index film 401 and the metal film 403. Moreover, as shown in FIG. 10C, it is acceptable to form a light producing portion 40 that serves as an electromagnetic wave producing portion by arranging the low refractive index film 401 on the surface of the dielectric particle 402 and the metal film 403 of FIG. 10A.

(Fourth Embodiment)

Figure 11:
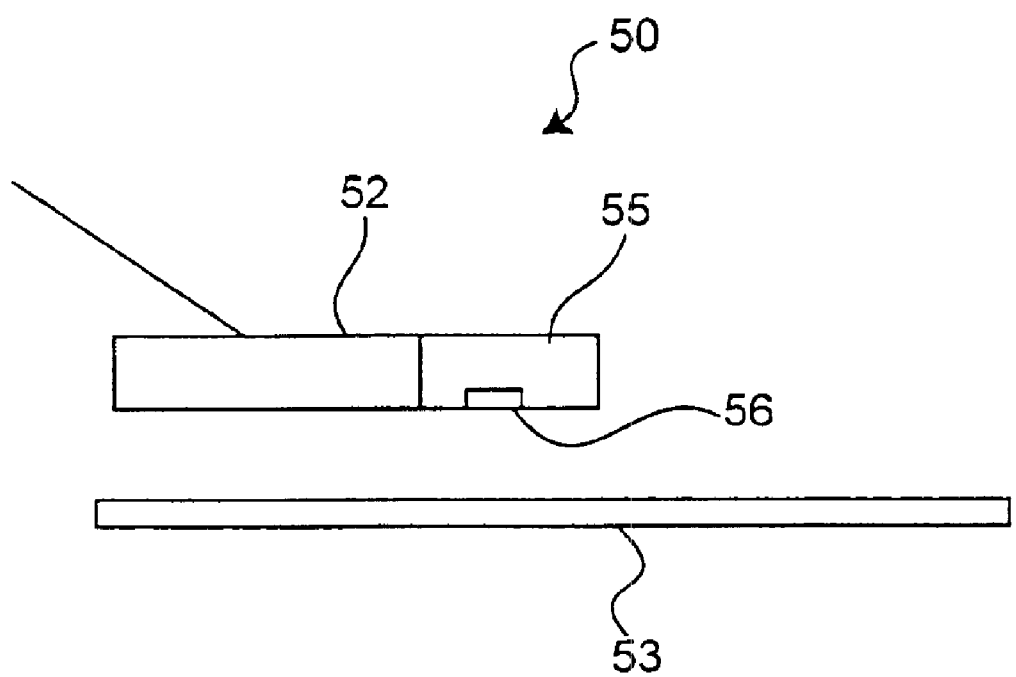
FIG. 11 is a view showing the optical sensor of the fourth embodiment of the present invention and an information recording medium read and write apparatus constituted by employing this optical sensor.

FIG. 11 is a view showing the optical sensor of the fourth embodiment of the present invention and an information recording medium read and write apparatus constituted by employing this optical sensor. The optical sensor 55 is the optical device of the present invention, and the information recording medium read and write apparatus is constituted by attaching this optical sensor 55 to a floating head 52. The optical sensor 55 is supported by the floating head 52 and makes a light producing portion 56 that serves as an electromagnetic wave producing portion face the information recording surface of a dielectric disk 53. The light producing portion 56 is supported at a distance of not greater than several hundred nanometers from the information recording surface of the dielectric disk 53. A layer that causes electric polarization by phase change is formed on the information recording surface of the dielectric disk 53. A minute region of this information recording surface is heated by the evanescent wave generated at the light producing portion 56 of the optical sensor 55 to cause further phase change. By this operation, information is recorded in the minute region of the information recording surface. When reading the information recorded on the dielectric disk 53, the evanescent wave is generated in a state in which the light producing portion 56 of the optical sensor 55 is brought close to the information recording surface of this disk 53. The excitation conditions of the surface plasma and the local surface plasma at the light producing portion 56 of the optical sensor 55 are changed by the influence of the electric polarization possessed by the information recording surface of the dielectric disk 53, and therefore, a change occurs in the laser oscillation condition in the active layer of the optical sensor 55. That is, a change occurs in the threshold current of laser oscillation in the active layer. By detecting this change in the threshold current, the intensity of the electric polarization on the information recording surface of the dielectric disk 53 is read, and the information represented by this change in the electric polarization state is read.

Items, which can be detected by the optical sensor 55, are not limited to the intensity of the electric polarization in the dielectric disk 53 but include the presence or absence of the electric polarization, the direction of the electric polarization, the existence and the intensity of the evanescent wave in the minute region and so on. Moreover, the detected signal can be amplified by using the optical amplification operation of the laser resonator. That is, this optical sensor 55 can use the laser resonator as an optical amplifier of the signal of the evanescent wave.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical device comprising:
   a light-emitting layer having two end faces that form a laser resonator;
   an electromagnetic wave producing portion that is located between the two end faces in a direction in which the two end faces oppose to each other and produces an electromagnetic wave from the light-emitting layer.

2. The optical device as claimed in claim 1, wherein
   the electromagnetic wave producing portion has a refractive index different from a refractive index of a neighborhood of the electromagnetic wave producing portion and, assuming that a wavelength of laser light generated by the laser resonator is $\lambda$ and a refractive index of the light-emitting layer is n, then the electromagnetic wave producing portion has a dimension smaller than $\lambda/n$.

3. The optical device as claimed in claim 1, wherein
   the light-emitting layer has a stripe-shaped light-emitting region,
   the electromagnetic wave producing portion is located on a side of the light-emitting layer, and
   a distance between a center in a widthwise direction of the light-emitting region and a side surface of the light-emitting layer on the electromagnetic wave producing portion side is smaller than a width of the light-emitting region.

4. The optical device as claimed in claim 1, further comprising:

a low refractive index layer that is put in contact with the light-emitting layer and has a refractive index lower than a refractive index of the light-emitting layer, the electromagnetic wave producing portion is formed at the low refractive index layer.

5. The optical device as claimed in claim 1, further comprising:

a low refractive index layer that is put in contact with the light-emitting layer and has a refractive index lower than a refractive index of the light-emitting layer, the low refractive index layer having a thickness smaller than a distance of leak of an electromagnetic wave leaking toward the low refractive index layer side when light from the light-emitting layer side is totally reflected on an interface where the light-emitting layer and the low refractive index layer are put in contact with each other;

a shield layer for shielding the electromagnetic wave leaked from the interface where the light-emitting layer and the low refractive index layer are put in contact with each other, the shield layer being provided on a side of the low refractive index layer, the side being opposite from the side put in contact with the light-emitting layer; and the electromagnetic wave producing portion is formed at the shield layer.

6. The optical device as claimed in claim 1, wherein the electromagnetic wave producing portion is provided with a metal film that has a prescribed thickness.

7. The optical device as claimed in claim 1, wherein the electromagnetic wave producing portion is provided with a metal particle that has a prescribed diameter.

8. An optical sensor comprising:

the optical device claimed in claim 1; and the optical device detecting a state of an object to be measured by measuring a threshold current of laser oscillation in the light-emitting layer in a state in which the electromagnetic wave producing portion of the optical device and the object to be measured are brought close to each other.

* * * * *